United States Patent [19]
Jones et al.

[11] Patent Number: 5,723,550
[45] Date of Patent: Mar. 3, 1998

[54] BULK SULFONATION OF EPDM RUBBER

[75] Inventors: Cruise K. Jones, Houston; David B. Acker, Woodlands; Dennis A. Williams, Houston; Robert D. Lundberg, Williamsburg; Vijay Swarup, Houston, all of Tex.

[73] Assignee: Nalco/Exxon Energy Chemicals, L.P., Sugar Land, Tex.

[21] Appl. No.: 449,234

[22] Filed: May 24, 1995

[51] Int. Cl.$^6$ .................................................. C08F 8/36
[52] U.S. Cl. ......................................... 525/344; 525/331.8
[58] Field of Search .................................................. 525/344

[56] References Cited

U.S. PATENT DOCUMENTS

| 4,147,677 | 4/1979 | Lundberg et al. . |
| 4,157,432 | 6/1979 | Lundberg et al. . |
| 4,442,011 | 4/1984 | Thaler et al. . |

Primary Examiner—Christopher Henderson
Attorney, Agent, or Firm—Robert A. Miller; Kelly L. Cummings

[57] ABSTRACT

EPDM elastomer is sulfonated and neutralized by a bulk process involving mechanical mixing at low temperatures in the sulfonating and neutralizing steps. The EPDM is discharged from the mixing process as finely divided particles having a low bulk density.

12 Claims, No Drawings

BULK SULFONATION OF EPDM RUBBER

BACKGROUND OF THE INVENTION

This invention relates to the bulk sulfonation of ethylene-propylene terpolymers, referred to as EPDM rubber, using a mechanical mixing process.

Sulfonated EPDM has many uses, including an oil base mud additive, controlled-release coatings, adhesives, and oil composites.

One of the principal uses of sulfonated EPDM, however, as indicated above, is as a drilling mud viscosifying agent for oil-based muds. U.S. Pat. No. 4,442,011 discloses one such use of a neutralized sulfonated EPDM and describes a solvent process for preparing the sulfonated EPDM. In the solvent process, the EPDM is dissolved in a suitable solvent followed by the addition of a sulfonating agent. The sulfonated terpolymer is then neutralized with a salt of a cation selected from Groups 1A, 2A, 1B, and 2B of the Periodic Table element and anions of carboxylic acids, hydroxides, and alkoxides. Following the neutralization step, the neutralized sulfonated terpolymer is precipitated as a fine crumb and collected by filtration.

The process for sulfonating and neutralizing EPDM in accordance with U.S. Pat. No. 4,442,011 has several objectionable features: (1) The EPDM must be dissolved in a solvent to sulfonate the polymer. (2) Following neutralization, the polymer must be recovered from solvent and dried to produce a useful form for packaging. These two steps are avoided in the method of the present invention.

Another process for sulfonation of EPDM is described in U.S. Pat. No. 4,157,432. In this process, mechanical mixing of the terpolymer with the sulfonating agent is carried out substantially free of any solvent, followed by the addition of a neutralizing agent.

One of the problems associated with the mechanical mixing process described in U.S. Pat. No. 4,157,432 is that it produces a product which is in the form of large coherent mass. In order to reduce the neutralized sulfonated EPDM to a form of utility in many applications, it must be in the form of discrete small particles which remain free flowing and having an average diameter not greater than ¼ inch. It is clear that for some applications, especially those that require dissolution, that the large coherent mass is inappropriate for those applications. Similarly, even those applications that require ultimate compound in a state of fluxing, a small particulate form is much more desirable. The mass produced by the process of U.S. Pat. No. 4,157,432 must be further processed to obtain the particulate polymer suitable for use.

SUMMARY OF THE INVENTION

It has surprisingly been discovered that by carefully selecting the materials used in the bulk sulfonation and carefully controlling the process conditions, particularly the temperature, a particulate sulfonated EPDM can be obtained directly from the process. The in situ formation of the sulfonated EPDM in accordance with the present invention produces a particulate product which can be used in a variety of applications without further processing. One such application is an oil-base mud viscosifier. The particulate sulfonated EPDM can be added directly to the mud.

The sulfonated EPDM produced by the method of the present invention is in the form of non-tacky rounded particles having a maximum average diameter of not more than about ¼ inch, preferably not more than about ⅛ inch. These particles exhibit good flowability, making them ideally suited for packaging, storage, transport, and application.

Briefly, the method of the present invention involves the following steps:

(a) mixing in a mechanical mixer an EPDM elastomer with an effective amount of a sulfonating reagent at a mixing temperature which does not exceed 80° C. under fluxing conditions to thoroughly distribute the sulfonating reagent in the EPDM to sulfonate the EPDM;

(b) mixing the sulfonated EPDM in a mechanical mixer with a neutralizing agent selected from ammonium carbonate and hydroxides or carbonates of Na, K, Ca, and Mg at a mixing temperature which does not exceed 90° C., whereby the sulfonated EPDM is neutralized and processed into finely divided particles in the mixer; and (c) withdrawing the particles from the mixer.

Because of the relatively low operation temperature of the process, it is preferred to incorporate an effective amount of $C_4$–$C_{26}$ carboxylic acid processing aid in the EPDM.

The sulfonation step of the process is carried out at fluxing conditions wherein the polymer has sufficient plasticity to permit the polymer to be worked or kneaded as a mass to thoroughly disperse the sulfonating reagents therein.

For purposes of the present invention, the neutralization step should be carried out at conditions wherein the polymer has at least a minimal amount of plasticity to permit working or kneading in the mixer as a mass. This apparently causes the mixer to separate the polymer mass into discrete particles and process them into small rounded particles.

Although the reasons for the improved results over the bulk sulfonation process of U.S. Pat. No. 4,157,432 are not fully understood, it is believed that the combination of lower mixing temperatures and the use of only hydroxide and carbonate neutralizers play significant roles. The presence of the carboxylic acid processing aid in the preferred embodiment also is an important difference. The lower temperatures in the neutralization step are below the fluxing or fusion temperatures of the sulfonated EPDM, so that, unlike the process in U.S. Pat. No. 4,157,432, the mixer particulates the sulfonated polymer during the neutralization step or shortly thereafter. The combination of added small molecules such as water, low molecular weight alcohols, thiols, as examples and in-situ generation of these types of materials may also play a major role in this particle formation.

DESCRIPTION OF THE PREFERRED EMBODIMENTS

The process of the present invention will be described with reference to the materials used in the process, mixing equipment, and materials.

MATERIALS

The materials used in the process of the present invention include: EPDM, processing aid, Sulfonating reagent(s), and neutralizing agent.

EPDM

The process of the present invention is described specifically as the bulk sulfonation of EPDM (ethylene-propylene-diene elastomers). Most of the EPDM elastomers are terpolymers containing from 40 to 90 mole percent of ethylene, from 20 to 70 mole percent of propylene, and from 1 to 20 mole percent of the diene monomer. The dienes include 5-ethylidene-2-norbornene, 1,4-hexadiene, 5-phenyl-2-norbornene and dicyclopentadiene. As stated in the *ENCYCLOPEDIA OF POLYMER SCIENCE AND ENGINEERING*, Vol. 6, pp. 522–523, ethylene-propylene elastomers are made from the basic building blocks of ethylene and propylene and may be combined with a third, or even a fourth, monomer to provide the olefinic sites along the backbone. The term "EPDM elastomers" includes terpolymers and tetrapolymers that include at least monomers of ethylene, propylene, and diene.

The preferred EPDM elastomers (ethylene/propylene/5-ethylidene-2-norbornene) have about 0.5 to about 20 wt % 5-ethylidene-2-norbornene monomer, about 30 to 70 wt % ethylene, with the balance of the polymer being propylene. A typical ethylene/propylene/5-ethylidene-2-norbornene terpolymer has an ethylene content of about 50 wt % and a 5-ethylidene-2-norbornene content of about 5 wt %. The terpolymers useful in the present invention have a number average molecular weight ($M_n$), as measured by GPC, of about 40,000 to about 150,000, more preferably of about 40,000 to about 100,000, and most preferably of about 50,000 to about 80,000. All polymer molecular weights quoted herein are number average molecular weights unless otherwise indicated. The Mooney viscosity (ML 1+8, 100° C.) of the terpolymer is about 5 to about 90, more preferably of about 10 to about 80 and most preferably about 20 to about 80. The EPDM should have a low crystallinity (<50%) and preferably less than 30%. The degree of crystallinity and molecular weight ranges are particularly important. Low to zero crystallinity is preferred because these polymers require less energy to flux the polymer. Non-crystalline EPDM's with molecular weights of less than 50,000 do not readily particulate under conditions of the present invention. EPDM terpolymers useful in the present invention are commercially available in a variety of grades from a number of manufacturers, including Exxon, Uniroyal, Dupont, DSM Copolymer, and Polysar to name a few.

Processing Aid:

Carboxylic acid having from 4 to 30 carbon atoms serves to improve the processability of the EPDM during the sulfonation step. The carboxylic acid not only functions as a plasticizer for the EPDM, permitting the process to be carried out at lower temperatures, but it also improves the solubility of the sulfonating reagent (e.g. carboxylic acid anhydride) in the EPDM. The carboxylic acid preferably has from 6 to 18 carbon atoms, and most preferably from 6 to 12 carbon atoms. Specifically preferred acids include octanoic acid, hexanoic, and heptanoic. These acids are commercially available in essentially pure form as 99 wt. %.

Sulfonating Reagents:

Although the sulfonating reagents disclosed in U.S. Pat. No. 4,157,432 (the disclosure of which is incorporated herein by reference) may be used in the sulfonation phase of the present invention, the preferred sulfonating reagents are (a) anhydrides of carboxylic acids, (b) sulfuric acid, and (c) combinations of those.

The preferred acid anhydrides include those of $C_3$ to $C_{30}$, preferably $C_3$ to $C_{18}$, carboxylic acids. Specific acid anhydrides include acetic anhydrides, propionic anhydride, hexanoic anhydride, 2-ethylhexyl anhydride, and octanoic anhydride.

Neutralizing Agents:

The neutralization agents include bases selected from (a) the hydroxides and carbonates of Na, K, Ca, and Mg; (b) ammonium carbonate, and (c) hydrates of Na, K, Ca, and Mg. The preferred bases are ammonium carbonate, calcium carbonate, potassium carbonate, sodium carbonate, and calcium hydroxide. It is preferred that with the metal hydroxides and carbonates, the base include from 2 to 40 wt. % (preferably 5 to 20 wt. %) of water or water/alcohol mixture based on the weight of the neutralizing agent. The water/alcohol mixture may range widely (e.g. 90/10 to 10/90 wt. ratios). It is particularly preferred to use the water or water/alcohol mixture when using the metal hydroxides and metal carbonate neutralizers.

Mixing Equipment:

The sulfonation and neutralization steps are preferably carried out in the same mixing device.

A wide variety of machines are available in the plastics and rubber industry for mixing, with varying degrees of shear (from about 10 sec$^{-1}$ to greater than about 1000 sec$^{-1}$) resinous and elastomeric materials with solid or liquid reagents under controlled conditions of temperature, mechanical pressure and atmosphere. Prior to reaction with a sulfonation reagent, the EPDM may be granulated by passage through a mechanical chopper. The equipment used for mixing the EPDM with the sulfonating reagent, whether done in a batch, semi-continuous, or fully continuous process, must exert sufficient stress at the temperature of operation in order to ensure plasticity of the mixture, at least in the sulfonation step.

Preferably, the mechanical mixing device is a Banbury Mixer or similar mixer equipped with helical sigma blades rotating in the opposite direction or Brabender Plasticorder or Bramley Beken blade mixer, to name a few of the mechanical mixers commercially available in the plastics and rubber industries.

The mixing equipment is described in more detail in U.S. Pat. No. 4,157,432, the disclosure of which is incorporated herein by reference.

PROCESS CONDITIONS

Sulfonating Step: In sulfonating the chopped EPDM, which is in the form of an elastomer is placed in the mixer and operated while maintaining the temperature at between room temperature (20°-25° C.), but not to exceed 80° C. The mixing of the EPDM is continued until the flux condition (i.e. 2 minutes) has been reached. As used herein, flux conditions mean that the polymer is in the form of a melt permitting it to be worked or kneaded as a deformable mass. If used, the carboxylic acid (e.g. octanoic acid) may be added to the EPDM at this stage, or may be added as a mixture with the acid anhydride as described below. Once flux conditions have been reached, the sulfonating agent is added to the EPDM. The sulfonating agent may be preformed as, for example, mixing the carboxylic acid anhydride and sulfuric acid in the proper mole ratio and then introducing the sulfonating agent into the mixer and continuing rotation thereof until the sulfonating agent is fully fluxed and distributed throughout the terpolymer. Preferably, however, the sulfonating agent is formed in situ by the separate addition of the carboxylic acid anhydride and sulfuric acid. This preferably is accomplished in sequence by adding the propionic acid anhydride dropwise into the fluxing rubber followed by adding dropwise the sulfuric acid. This sequential addition of the anhydride and sulfuric acid may be repeated three or four times. Fluxing of the EPDM with the sulfonating reagents is continued to thoroughly distribute the reagents throughout the EPDM and sulfonate the EPDM.

It is preferred to add the carboxylic acid and carboxylic acid anhydride as a mixture to the EPDM. The presence of the carboxylic acid appears to improve the solubility and distribution of the sulfonating reagent in the EPDM.

In an alternative sulfonation procedure, the reagent may be prepared in situ by the serial addition of all of the propionic anhydride (with or without the carboxylic acid) to the EPDM, mixing thoroughly and then adding the sulfuric acid in a slow stream or in discrete incremental amounts. Another method is the alternate addition of incremental amounts of propionic anhydride and sulfuric acid to the plasticized polymer beginning with the propionic anhydride.

By way of illustration only, the concentration of the materials in the EPDM and the operating conditions for the sulfonation step may be as follows:

|  | Range | Preferred Range |
|---|---|---|
| Carboxylic acid Sulfonating reagent | 0.1–5 wt. % | 0.5–4 wt. % |
| (a) sulfuric acid | 0.1–5 wt. % | 0.5–5 wt. % |
| (b) acid anhydride | 0.2–10 wt. % | 1–5 wt. % |
| Mole ratio (a)/(b) | 1.0/0.5–1.0/5.0 wt. % | 1.0/1.0–1.0/3.0 wt. % |
| Time | 5 sec.–2 min. |  |
| Temperature | 20° C.–80° C. | 25° C. to 70° C. |

In the sulfonation of the EPDM, it is important that the EPDM be in a state of plasticity to ensure uniform distribution of the reagents throughout the polymer. However, it has been found that high temperatures should be avoided, as these tend to promote undesired reactions or crosslinking in the polymer. In accordance with an important feature of the present invention, the sulfonation step of the process should not exceed 80° C., and preferably should not exceed 70° C. Experiments described below have demonstrated that the presence of the carboxylic acid in the EPDM during the sulfonation step permits adequate fluxing at temperatures below 80° C. It is important to note that certain non-volatile hydrocarbon additives can be incorporated into the polymer to be sulfonated in order that the fluxing be effected more readily or at a lower temperature. For example, the addition of hydrocarbon paraffinic oils to ethylene propylene terpolymer will lower the melt viscosity and expedite the reaction. It is important to note that such a mixture constitutes a bulk sulfonation system since the oil or additive will constitute less than 10 parts per 100 parts of polymer to be sulfonated. Furthermore, these additives will be non-volatile and thereby be compatible with and part of the sulfonated polymer phase. In addition to the oils, selected polymers can be added, e.g. ethylene propylene copolymer, polyethylene, polypropylene and the like can be incorporated into the EPDM to be sulfonated. These additives will not normally react with the sulfonating or neutralization agents.

EPDM terpolymers which contain levels of unsaturation sufficient to give a sulfonic acid level of about 5 to about 100 meq are preferred with levels of 10 to 50 being most preferred. Ethylene propylene terpolymers (EPDM) are available commercially that can fall into this range of unsaturation.

Neutralization Step:

Following the sulfonation step the base is added to the mechanical mixer to neutralize the sulfonated EPDM. The mixing is continued until neutralization is complete, which generally takes about 1½ minutes. The neutralization temperature is generally from 5° to 10° C. higher than the sulfonation step, but it should not exceed 90° C.

The neutralization causes the viscosity to increase to a point that the polymer cannot be fluxed at the operating temperature of the mixer (20° C. to 90° C.). During the neutralization step the temperature of the EPDM increases slightly (less than about 10° C.) but not enough to maintain the polymer in a state of plasticity to permit rolling or kneading of the mass. The continued mixing causes the polymer to break up or particulate and be rolled into small discrete particles. The presence of $CO_2$ (produced from ammonium carbonate neutralizing agents) and/or water produced from hydroxides or water of the base appear to aid in the particle formation.

The mixing of the particles in the mixer is continued until they have been reduced to a size (average particle size) less than ¼ inch in average diameter, preferably less than ⅛ inch in average diameter, and most preferably less than 0.1 in., at which time the particles spill out of, or are removed from, the mixer and are collected.

The following summarizes the neutralization step:

Neutralization agent: $Ca(OH)_2$, $CaCO_3$, $Na_2CO_3$, $(NH_4)_2CO_3$, NaOH.

Concentration: 60–100 wt % aqueous or alcoholic solution or mixture

Concentration in EPDM: 6–12 wt. %

Time: From 10 seconds to 5 minutes

Temperature: From 20° C. to 90° C., preferably 25° C. to 80° C.

The bulk density of the finely divided particles discharged from the mixer ranges between 0.05 to 0.6 gr./ml., preferably 0.1 to 0.4 gr./ml., and most preferably between 0.15 to 0.3 gr./ml. which is substantially lighter than the bulk density of the product produced in accordance with U.S. Pat. No. 4,157,432.

As indicated above, a particulated low density neutralized and sulfonated EPDM is highly desirable for many applications involving the addition of the product to liquids (e.g. mud viscosifier) or solids. The particulate form and low density enable the particles to be readily dispersed in the liquid or solid.

EXAMPLES

The following examples demonstrate the ability of the bulk mechanical mixing process using the above mentioned salts to produce a neutralized sulfonated EPDM particles.

Example 1

Forty-one grams of a chopped EPDM rubber[1,2] were added to a 45 gram Brabender apparatus bath at room temperature (approximately 72° F.) and rotated at 40 rpm for two minutes. The polymer was fluxed to a degree of plasticity that permitted it to be rolled as a deformable mass. Propionic anhydride (2.13 grams, 0.0164 moles) and concentrated (95–98%) sulfuric acid (1.05 grams, 0.0103 moles) are added alternately beginning with 25% of the total propionic anhydride feed, then 25% of the sulfuric acid feed, and this cycle is repeated until the last drop of sulfuric acid is added. Blending is continued for one minute followed by addition of ammonium carbonate (6.0 grams, 0.0624 moles) and fluxing continued for 3 minutes. The product is in particle form which spills from the Brabender and flows into a container. The rounded particles had an average diameter of less than ¼ inch. The maximum temperature of the polymer reached 55° C. It is believed that the dissolution of excess $(NH_4)_2CO_3$ to $CO_2$ and $NH_3$ and water provides energy to assist in particulating the EPDM mass into finely divided discrete particles.

[1] ethylene/propylene/5-ethylidene-2-norbornene rubber marketed by Uniroyal as Royalene 521. The mole ratio of the monomer was 50/45/5.
[2] ethylene/propylene/5-ethylidene-2-norbornene rubber marketed by DSM Copolymer as Keltan 7506.

Example 2

Same process as in Example 1 except 7.0 grams of ammonium carbonate were added and neutralized for 2 minutes. The extra gram facilitates neutralization, thus reducing blending time. The product was basically the same.

Examples 3–5

To a 45 gram Brabender at room temperature was added 45 grams EPDM at 50 rpm and mixed for 2 minutes. This was followed by alternate addition of a 70 wt % propionic anhydride solution (in octanoic acid) and concentrated (95–98%) sulfuric acid. The total time of addition from the first drop of propionic anhydride solution to the last drop of sulfuric acid was approximately 40 seconds. The contents were fluxed for 30 seconds beyond the final sulfuric acid addition and then an aqueous sodium carbonate mixture (about 10% water) was added and fluxed then for 90 seconds. At this point particles developed and discharged from the opening in the Brabender. The maximum temperature reached in Examples 3–5 was 55° C. Table I gives compositions.

TABLE I

| Example # | Grams 70 wt % Propionic Anhydride Solution | Grams $H_2SO_4$ | Grams $Na_2CO_3$ | Grams $H_2O$ |
|---|---|---|---|---|
| 3 | 1.6 | 0.65 | 5.0 | 0.65 |
| 4 | 2.2 | 0.86 | 6.6 | 0.86 |
| 5 | 2.8 | 1.10 | 10.0 | 1.10 |

In the above examples, the Propionic Anhydride/Sulfuric Acid mole ratio was 1.6:1.0.

A video recording of the process reveals the dramatic change in form of the EPDM between the sulfonation step and the neutralization step. At the end of the sulfonation step, the EPDM was in the form of a large mass of deformable polymer which could be readily rolled or worked by the mixer. Upon the addition of the neutralization agent, the form of EPDM began to change. The viscosity increased and after about 20 seconds the mass began to separate into smaller and smaller particles. After about 30 seconds the mixer began discharging rounded particles less than about ¼ inch in diameter (avg.).

The particles of Examples 3–5 were tested for solubility properties. Approximately one percent solutions were prepared in toluene and also toluene/methanol. The toluene/methanol solutions were 97/3 (wt/wt) respectively.

TABLE II

| Example # | Toluene | Weight Percent Solubility Toluene/Methanol 97/3 | Sulfonation Feed Level (meq sulfur/100 g polymer) |
|---|---|---|---|
| 3 | 85.01 | 96.97 | 15 |
| 4 | 64.12 | 83.83 | 20 |
| 5 | 47.88 | 77.98 | 25 |

The procedure for solubility determination was as follows: Sample was ground to fine powder for the purpose of maximizing surface area. Sample was then weighed to four decimal places and added to a 100 ml volumetric flask. This was followed by addition of a magnetic stir bar. One hundred milliliters of liquid (either toluene or the toluene/methanol (97/3 solution) was added and stoppered. These were stirred at room temperature for 24 hours and stirring stopped. After 2 hours (time for settling of suspended solids) 20 mls of the upper layer was carefully removed and added to a tared pan and volatiles allowed to evaporate to dryness followed by drying in an oven at 100° C. for 2 hours. Residues were weighed and weight percent solubilities were calculated.

Properties:

Tests carried out on the sulfonated and neutralized EPDM particles made in accordance with the present invention indicated a particle size in which 55% passed the 8 mesh screen (US Sieve) and had a bulk density of 0.20 gr./ml. Many of the particles passing the 8 mesh screen were powder size.

Comparative Examples:

Tests were carried out to duplicate Experiments 1–5 in U.S. Pat. No. 4,157,432. These tests resulted in a product characterized as a large mass of clumps of polymer. This product would have to be pelletized or go through a grinding operation in some manner to reduce it to a free flowing material. Even then, it is clear that such a product would have a higher bulk density, and therefore be less amenable to dissolution in a suitable solvent than the products of this invention.

The particulate produced by the present invention can be used in any application where neutralized sulfonated EPDM is used. Specific examples include (a) oil viscosifiers such as those used in drilling and well completion operations, and (b) admixing with other agents such as fillers and oils to produce a blend capable of being subsequently fabricated into tough elastomeric objects.

The process of the present invention permits the EPDM to be produced at the site of use, a significant advantage over the prior art solution process and bulk sulfonation process, both of which require additional processing.

For example, in drilling mud viscosification, the mechanical mixer and ingredients can be located at the drilling site. When the sulfonated EPDM is needed, the process of the present invention can readily and easily produce the mud additive.

The particulate form of the EPDM produced in accordance with the present invention also lends itself to dry blending with other agents. The mixer and ingredients can be located at the dry blending site.

The invention thus offers a simple and versatile process for producing particulate EPDM for a wide range of applications.

What is claimed is:

1. A method for sulfonating ethylene-propylene-5-ethylene 2-norbornene (EPDM) terpolymer which comprises the steps of:
   (a) mixing in a mechanical mixer the EPDM at a temperature between 20° C. and 80° C. with
      (i) an effective amount of a sulfonating reagent comprising a mixture of sulfuric acid and carboxylic acid anhydrides having from 3 to 18 carbon atoms to sulfonate the EPDM terpolymer, and
      (ii) a carboxylic acid processing aid having from 6 to 18 carbon atoms, the wt. ratio of (i)/(ii) being from 1.0/0.5 to 1.0/5.0;
   (b) mixing the sulfonated EPDM terpolymer with an effective amount of a neutralizing agent to neutralize the EPDM terpolymer at a temperature between 25° C. to 80° C., said neutralizing agent selected from the group consisting of
      $(NH_4)_2CO_3$,
      $CaCO_3$, $Ca(OH)_2$ $Na_2CO_3$, NaOH, $K_2CO_3$, KOH, $MgCO_3$,
      and $Mg(OH)_2$
   wherein the metal carbonates and hydroxides contain from 2 to 20 wt. % water or water/alcohol mixtures, said mixing step (b) continuing until the sulfonated neutralized EPDM has been reduced to finely divided discrete particles having an average particle size less than 0.25 inch.

2. The method of claim 1 wherein the EPDM terpolymer has a molecular weight between 50.000 and 150.000.

3. The method of claim 1 wherein the EPDM terpolymer has a crystallinity of less than 30%.

4. The method of claim 1 wherein the carboxylic acids anhydrides have from 3 to 18 carbon atoms.

5. The method of claim 4 wherein the acid anhydrides are selected from the group consisting of propionic anhydride, hexanoic anhydride, 2-ethylhexyl anhydride, and octanoic anhydride.

6. The method of claim 1 wherein the processing aid and the sulfonating reagent are added as a mixture to the mechanical mixer.

7. The method of claim 1 wherein the neutralizing agent is ammonium carbonate.

8. The method of claim 1 wherein the neutralizing agent is selected from the group consisting of $Ca(OH)_2$, $CaCO_3$, $Na_2CO_3$, NaOH containing from 2 to 20 wt. % water.

9. The method of claim 1 wherein the average particle size is less than 1/8 inch.

10. The method of claim 1 wherein the neutralizing step is carried out at a temperature not exceeding 70° C.

11. The method of claim 1 wherein the density of the particles is between 0.05 to 0.6 gr./ml.

12. The method of claim 1 wherein the particles have a density not in excess of 0.6 gr./ml.

* * * * *